United States Patent [19]

Yamaguchi

[11] Patent Number: 5,371,536
[45] Date of Patent: Dec. 6, 1994

[54] AUTOMATIC CONTROL OF IMAGE PICKUP POSITION OF OBJECT

[75] Inventor: Masakazu Yamaguchi, Kawasaki, Japan

[73] Assignee: Fujitsu Limited, Kanagawa, Japan

[21] Appl. No.: 159,102

[22] Filed: Nov. 30, 1993

Related U.S. Application Data

[63] Continuation of Ser. No. 779,460, Oct. 18, 1991, abandoned.

[30] Foreign Application Priority Data

Oct. 20, 1990 [JP] Japan .................. 2-283194

[51] Int. Cl.⁵ .............................. H04N 7/18
[52] U.S. Cl. .................. 348/169; 348/143; 348/15
[58] Field of Search .......... 348/14, 15, 155, 169, 348/143; 379/53, 54, 201, 202; H04N 7/18

[56] References Cited

U.S. PATENT DOCUMENTS

| | | | |
|---|---|---|---|
| 3,730,277 | 5/1973 | Brugler | 358/126 |
| 3,736,376 | 5/1973 | Kato, Jr. | 358/126 |
| 3,769,456 | 10/1973 | Woolfson | 358/126 |
| 3,955,046 | 5/1976 | Ingham et al. | 178/6.8 |
| 4,541,012 | 9/1985 | Tescher | 358/133 |
| 4,827,339 | 5/1989 | Wada et al. | 358/136 |
| 4,851,904 | 7/1989 | Miyazaki et al. | 358/105 |
| 4,996,592 | 2/1991 | Yoshida | 379/54 |
| 5,062,056 | 10/1991 | Lo et al. | 364/516 |
| 5,091,781 | 2/1992 | An | 358/125 |

FOREIGN PATENT DOCUMENTS

| | | | |
|---|---|---|---|
| 63-157593 | 6/1980 | Japan | H04N 7/18 |
| 57-21190 | 2/1982 | Japan | H04N 7/18 |
| 59-122975 | 7/1984 | Japan | H04N 5/24 |
| 60-120273 | 6/1985 | Japan | G01S 3/48 |
| 62-109485 | 5/1987 | Japan | H04N 7/14 |
| 2-007775 | 1/1990 | Japan | H04N 5/232 |

Primary Examiner—Joseph Mancuso
Assistant Examiner—Tuan V. Ho
Attorney, Agent, or Firm—Nikaido, Marmelstein, Murray & Oram

[57] ABSTRACT

A method of automatically controlling an image pickup position of an object includes the steps of compressively coding the derived image data and producing valid image data. An image plane is divided into a plurality of divisional areas by lines passing through the center of the image plane. The number of valid image data are counted, and information is produced on a position to which a calculation of image data is directed, deciding. The direction decided is determined by the highest count among the counting results. A direction of motion of a camera rotation table is based on the direction decision.

10 Claims, 17 Drawing Sheets

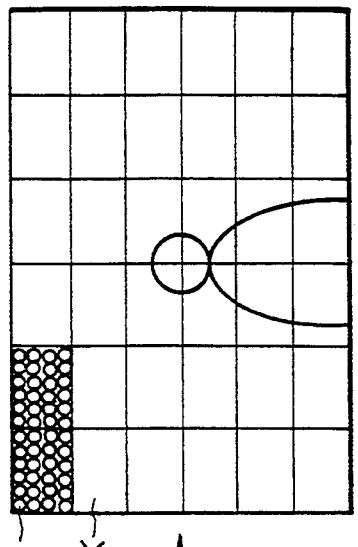
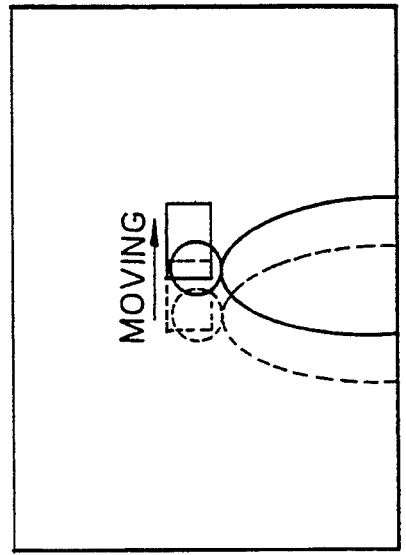
Fig. 3
Fig. 4
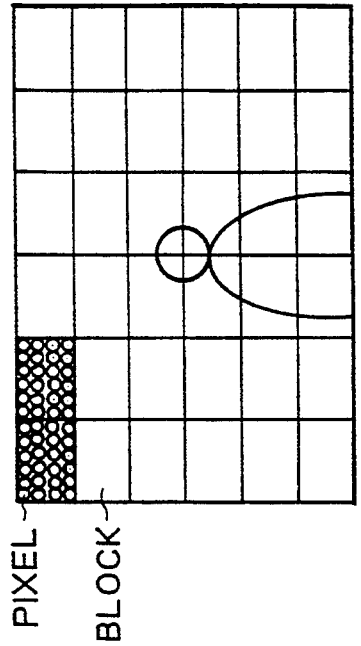
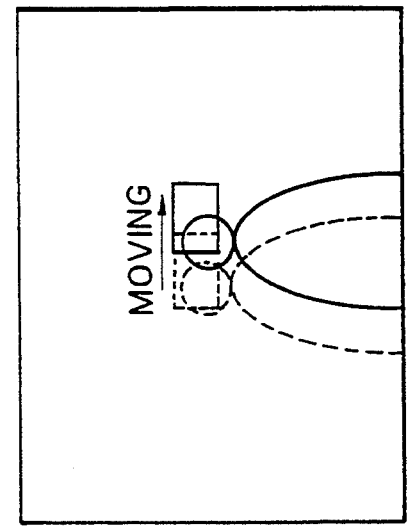

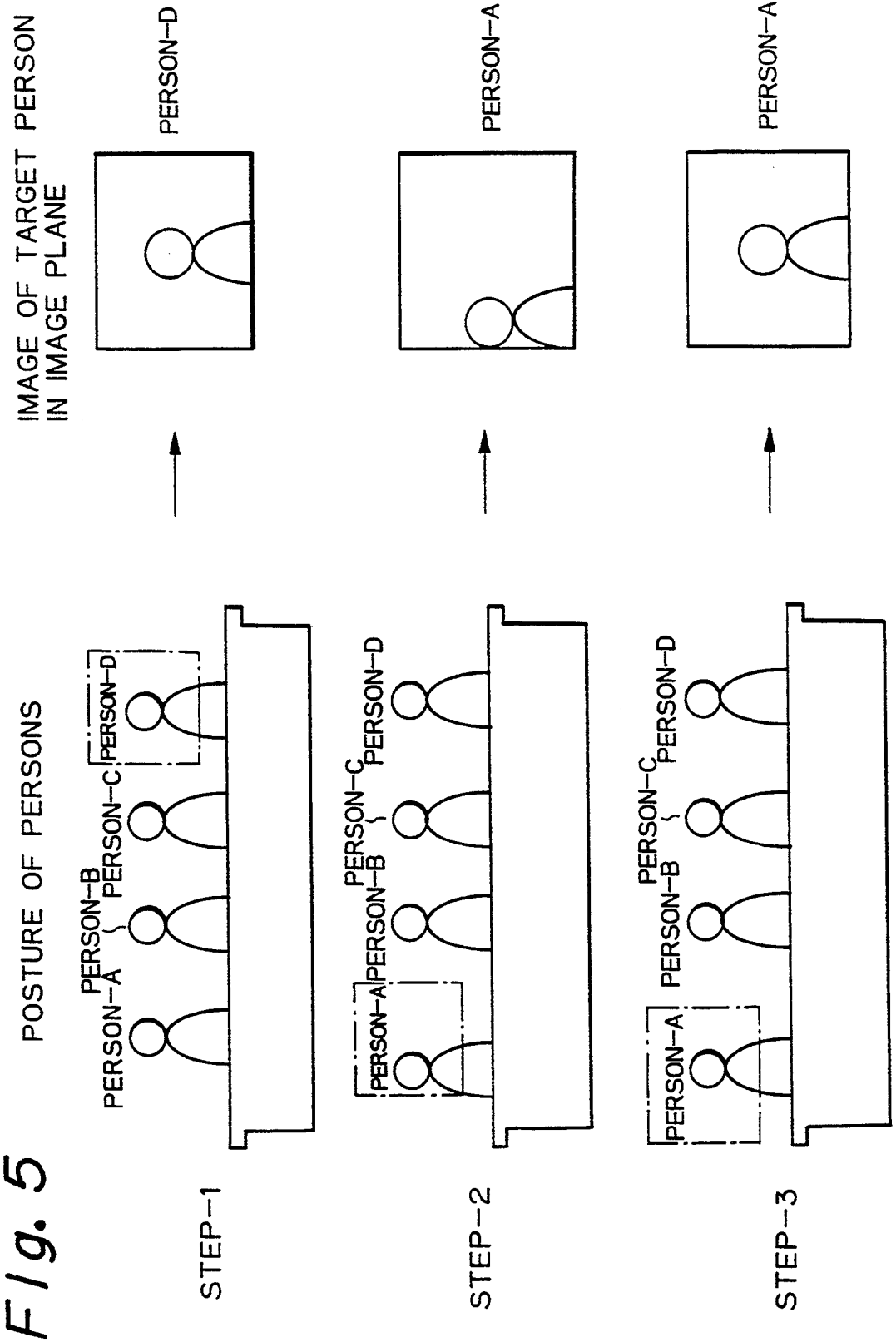

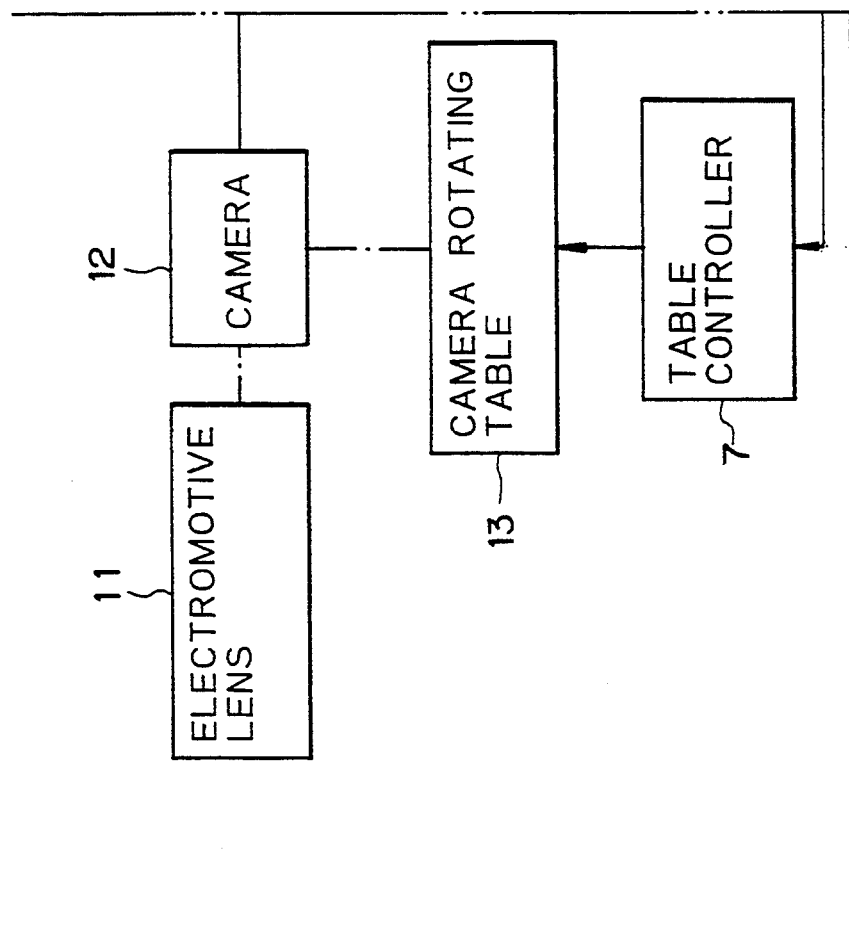

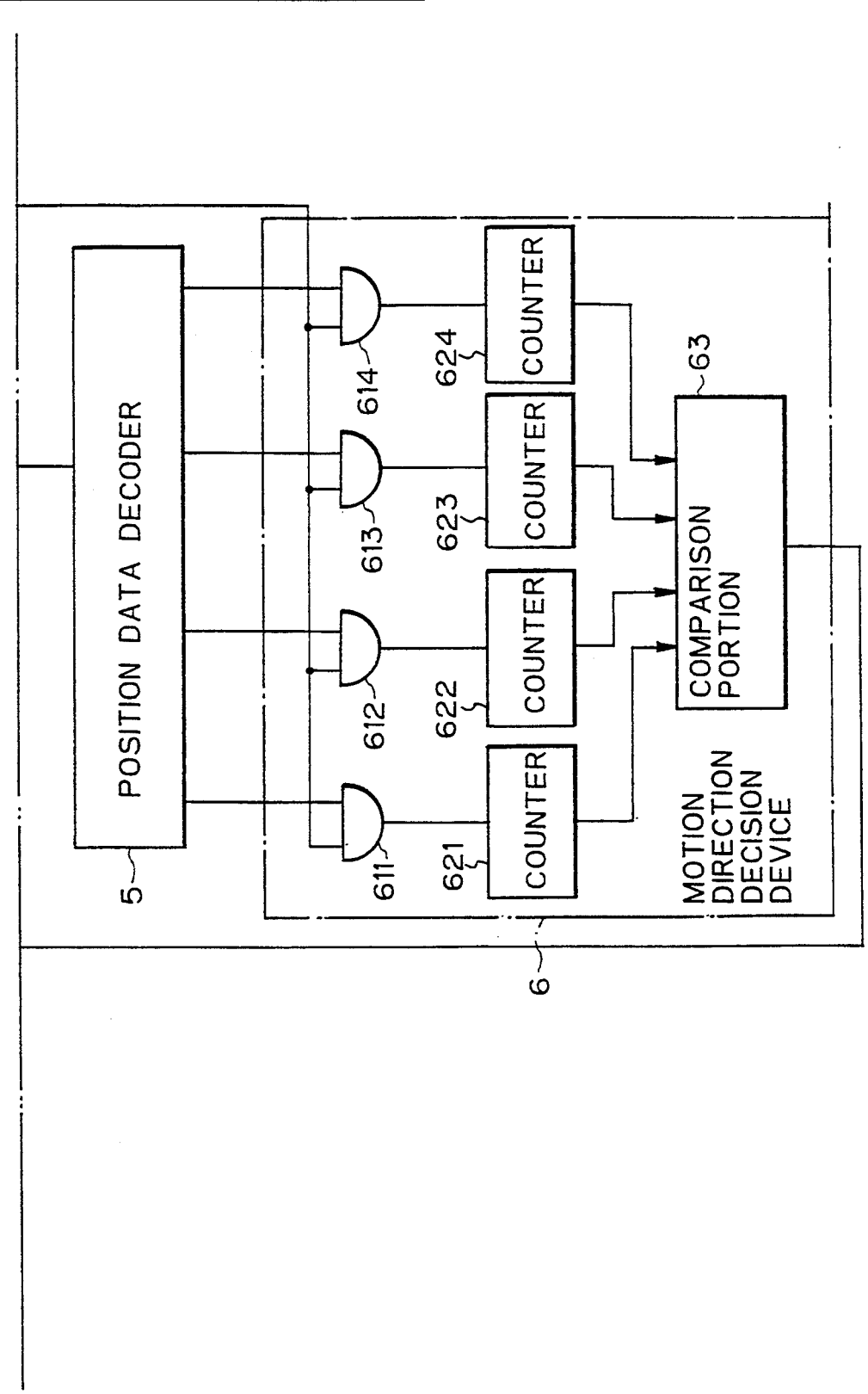

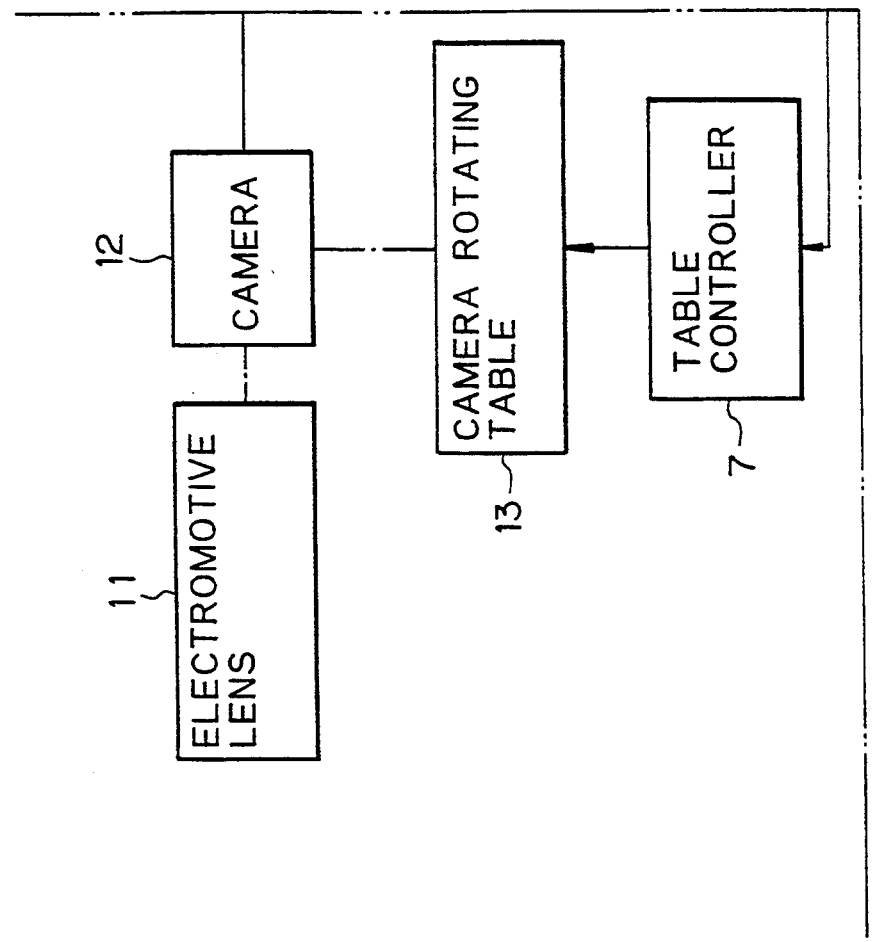

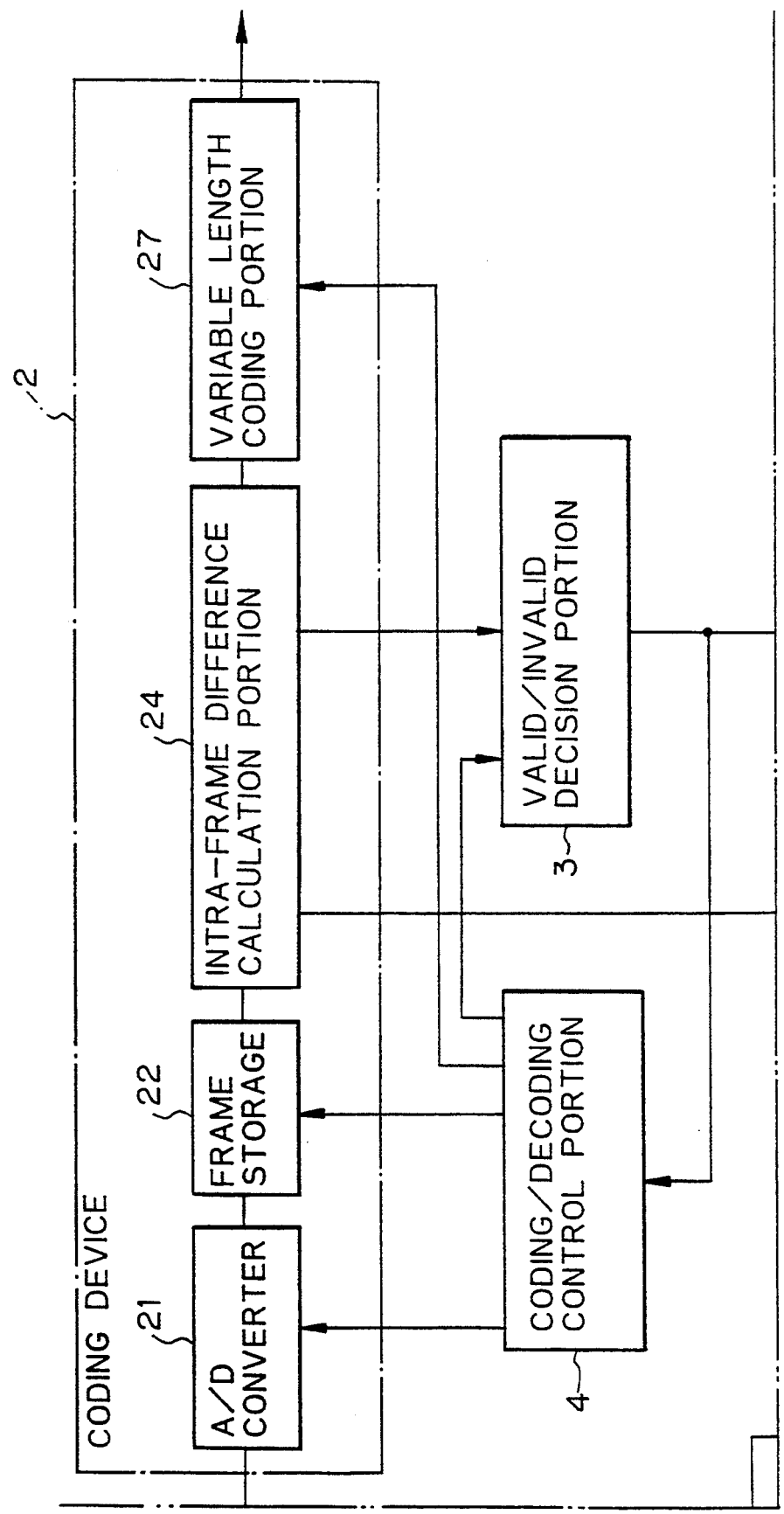

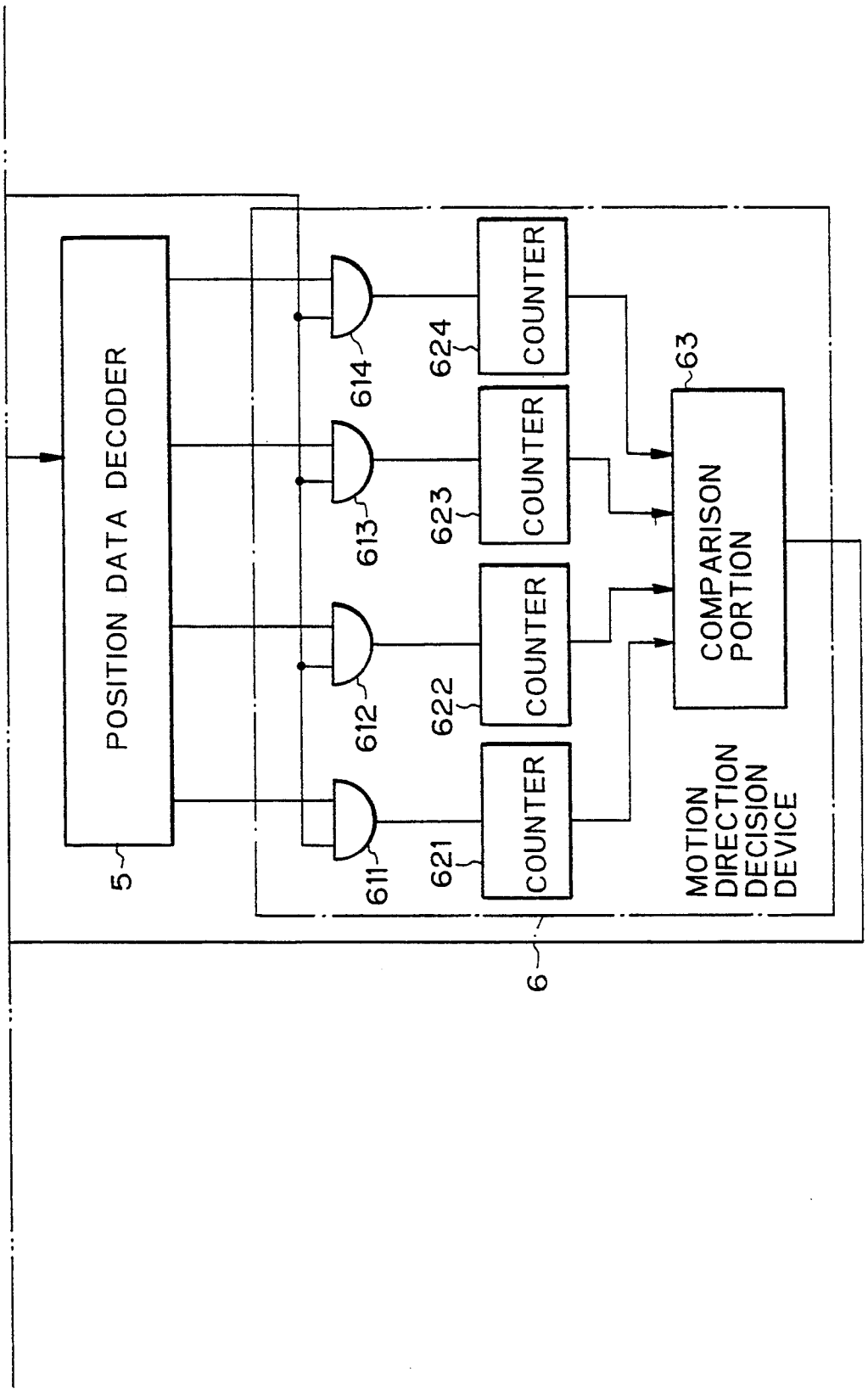

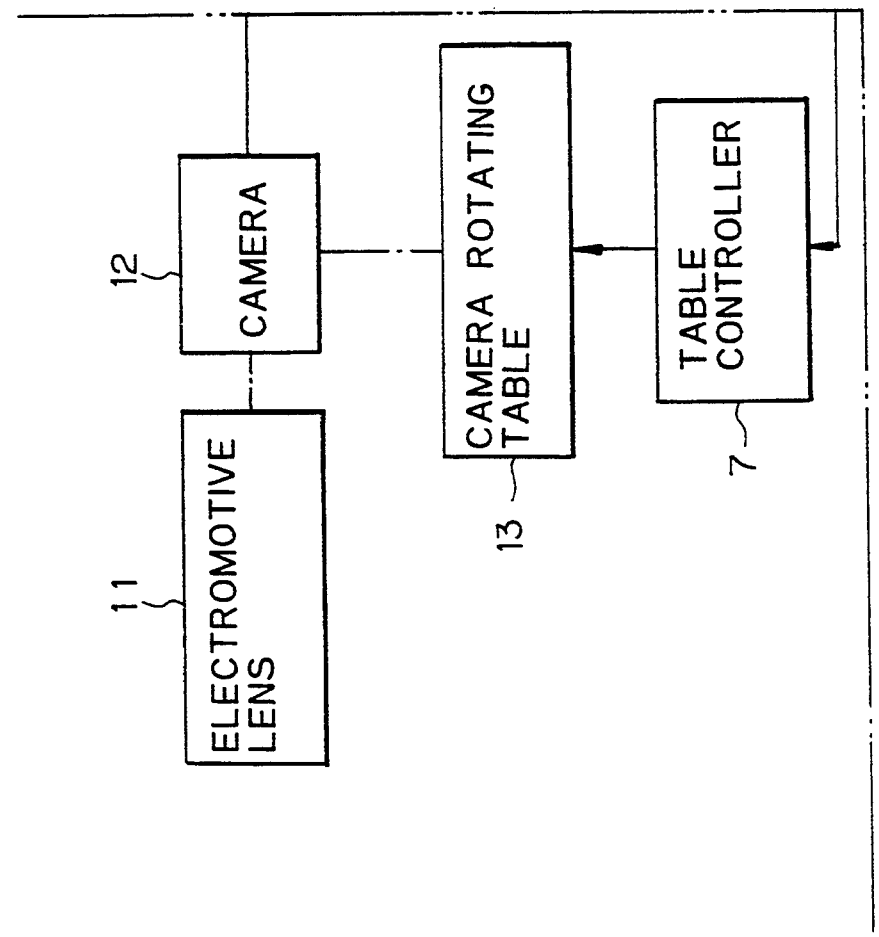

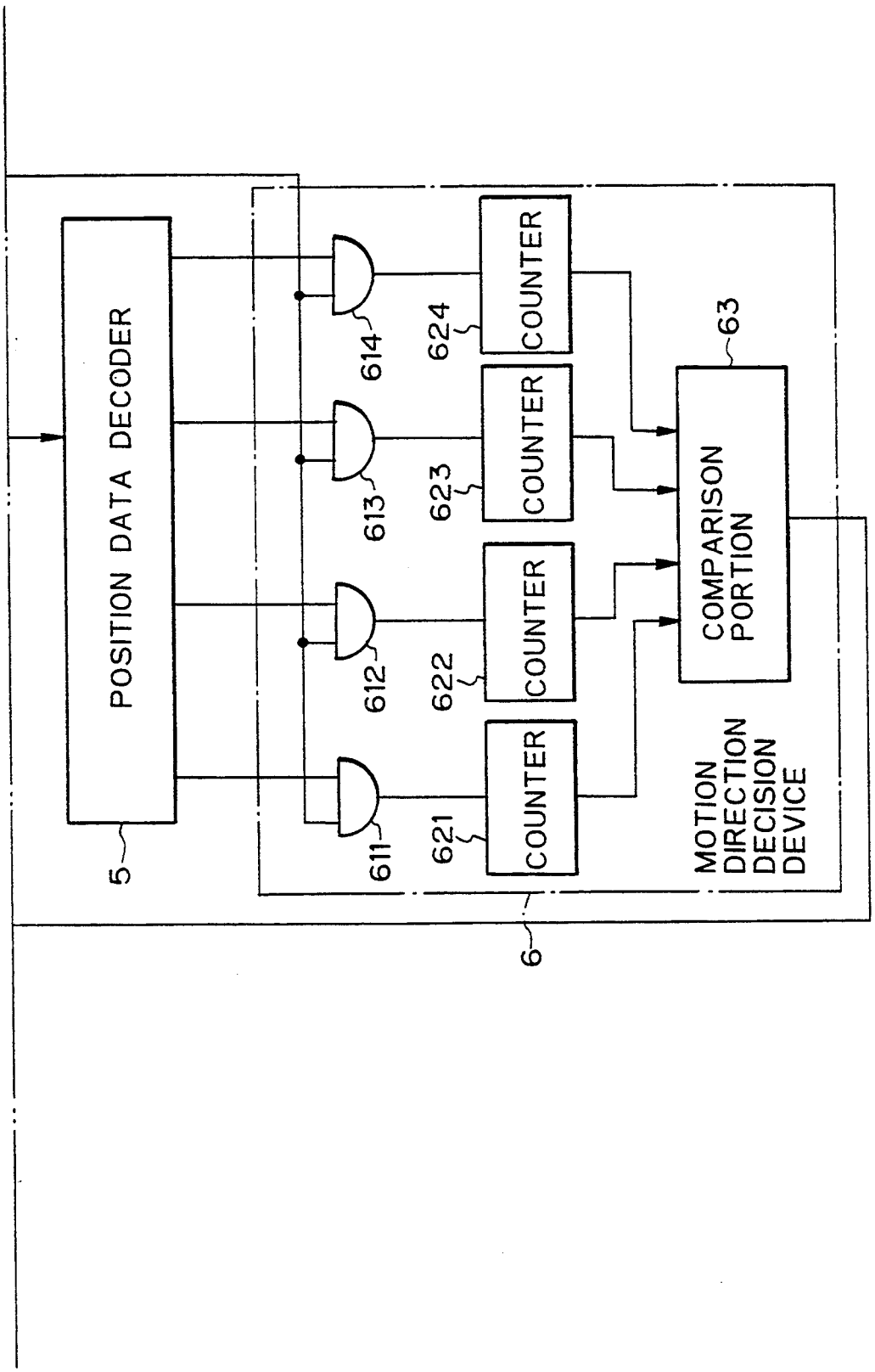

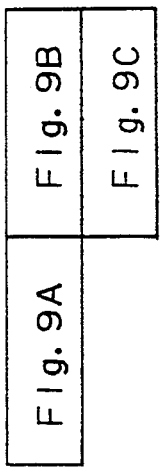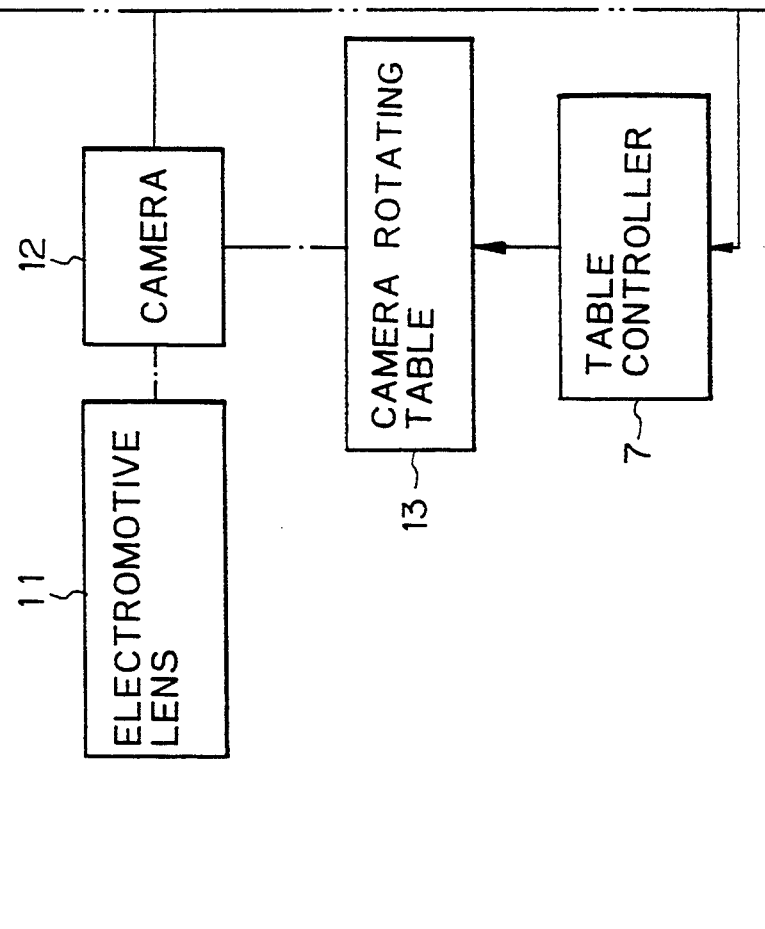

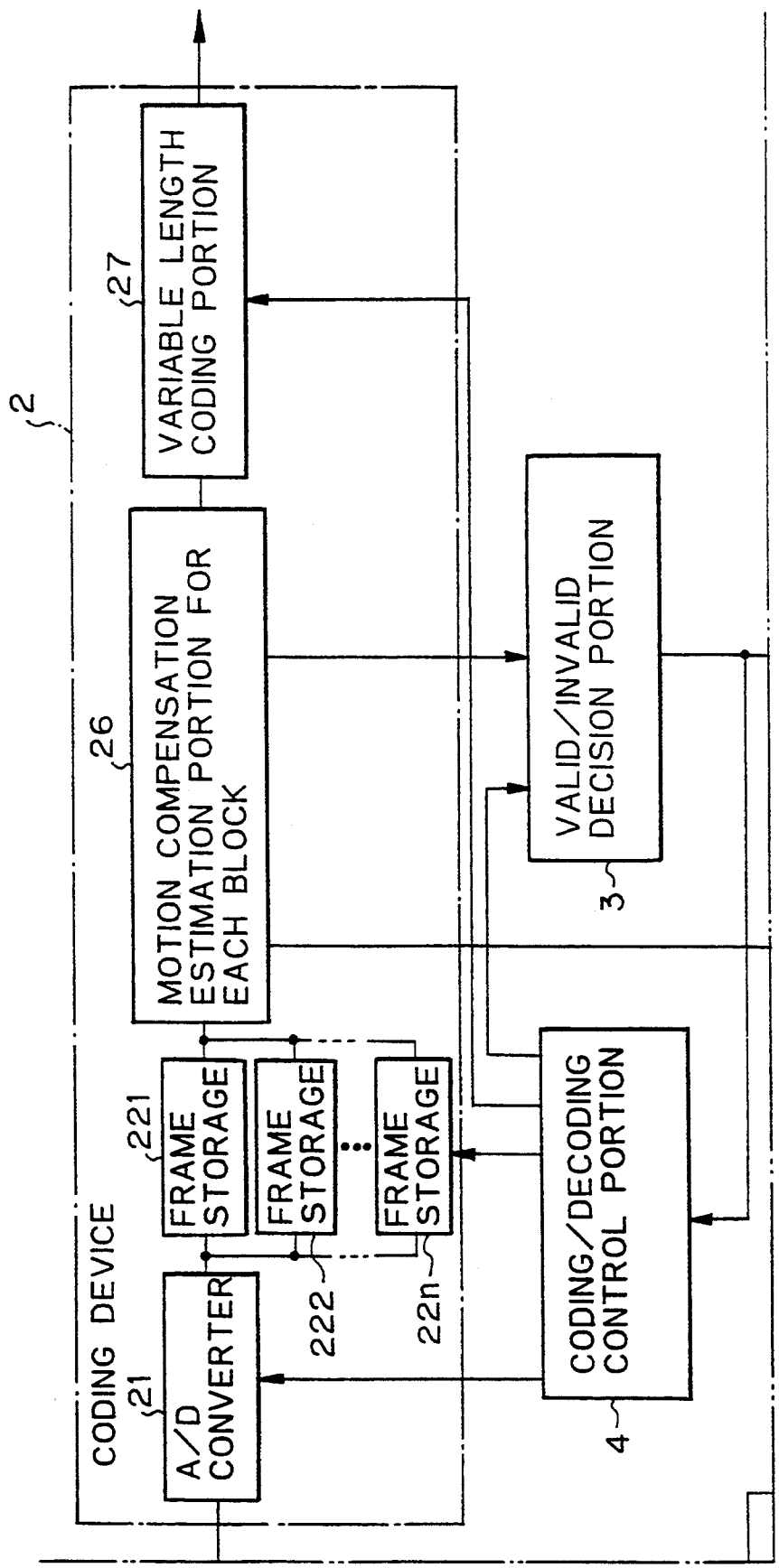

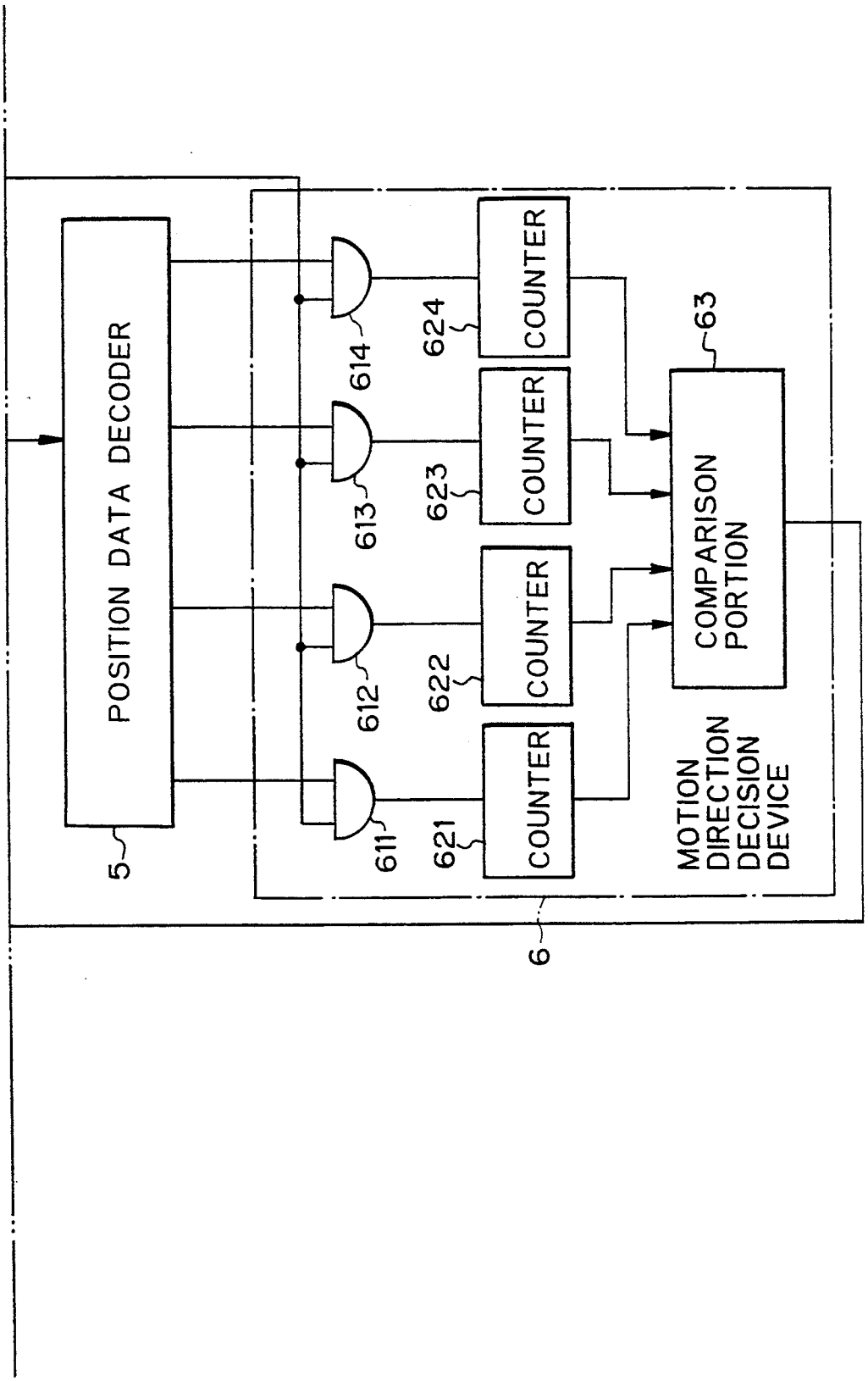

DIVISION OF IMAGE PLANE

AUTOMATIC CONTROL OF IMAGE PICKUP POSITION OF OBJECT

This application is a continuation of application Ser. No. 07/779,460 filed Oct. 18, 1991, now abandoned.

BACKGROUND OF THE INVENTION

1. Field of the Invention

The present invention relates to a method and an apparatus for automatically controlling an image pick-up position of an object. The method and apparatus according to the present invention are used for an automatic control of the direction of a camera placed on a camera rotation table as an image picking-up device used in a television conference system, in the camera direction presetting manner.

2. Description of the Related Arts

In a television conference system, the transmission of images is carried out by transmitting the image of the entire scene of a conference room, and by transmitting images of the faces of individuals participating in the television conference.

One method of transmitting the image of the face of an individual is to preregister the positions of the persons on whom a pick-up camera is to be focused, to assign an identification number to each of the preset positions, and to direct the pick-up camera by designating one of the identification numbers for directing the pick-up camera to the person to whom the pick-up camera is to be directed. This method is called the preset system.

In the preset system, often the person does not sit exactly in the registered position but sits at a position slightly away from the registered position. In this case, if a fine control of the direction of the pick-up camera can be made by an operation of a remote control device, but a problem arises in that such a fine control of the direction of the pick-up camera is time-consuming and troublesome, and accordingly, an efficient operation of the picking-up and the transmission of images during a television conference system is impossible.

SUMMARY OF THE INVENTION

Therefore, an object of the invention is to provide an improved method and apparatus for an automatic control of a pick-up position of an object during a television conference system in which the direction of a pick-up camera is automatically controlled so that the pick-up camera is exactly directed to produce an image of a scene whereat the image of the desired person is situated in the center of the image, and accordingly, an efficient operation of the picking-up and transmission of images during a television conference system is realized.

In accordance with the present invention, there is provided a method of automatically controlling an image pick-up position of an object, including the steps of: picking up images of an object and producing data of images therefrom; compressively coding the derived image data and producing valid image data; dividing an image plane into a plurality of divisional areas by lines passing through the center of the image plane; counting the number of valid image data; producing information on a position for which a calculation of image data is directed; deciding a direction determined by the majority of counts from the result of the counting; instructing a motion direction of a camera rotation table based on the direction decision; and controlling the motion of the camera rotation table in accordance with the direction of motion instruction.

In accordance with the present invention there is also provided an apparatus for automatically controlling an image pick-up position of an object including: an image pick-up camera for picking up an image of an object; a camera rotation table for placing a camera thereon and rotating the camera; a data compressive coding device for compressively coding data of an image picked up by the image pick-up camera; an image plane division device for dividing an image plane by lines passing through the center of the image plane; a counter for counting the number of valid image data; a position information production device for producing information on a position to which a calculation of image data is directed; a motion direction decision device for deciding a direction of motion of the camera rotation table, and a motion control device for controlling the motion of the camera rotation table in accordance with the decided direction.

BRIEF DESCRIPTION OF THE DRAWINGS

FIG. 3 illustrates a prior art image data compressive transmission system using an image data difference for each block of an image plane;

FIG. 4 illustrates a prior art image data compressive transmission system using an inter-frame motion-compensating type coding for each block of an image plane;

FIG. 5 illustrates an example of a sequence of picking-up images of persons at a television conference;

FIGS. 6A–6C are a schematic diagram of an apparatus for carrying out a method according to an embodiment of the present invention;

FIGS. 7A–7C are a schematic diagram of an apparatus for carrying out a method according to another embodiment of the present invention;

FIGS. 8A–8C are a schematic diagram of an apparatus for carrying out a method according to another embodiment of the present invention;

FIGS. 9A–9C are a schematic diagram of an apparatus for carrying out a method according to a still another embodiment of the present invention.

DESCRIPTION OF THE PREFERRED EMBODIMENTS

Before describing the preferred embodiments of the present invention, prior art image data compressive transmission systems using inter-frame image difference data, intra-frame image difference data, an image data difference for each block of an image plane, and an inter-frame motion-compensating type coding for each block of an image plane will be explained with reference to FIGS. 1 to 4. Also, an example of a sequence of picking-up of images of persons at a television conference will be explained with reference to FIG. 5.

Figure 1:
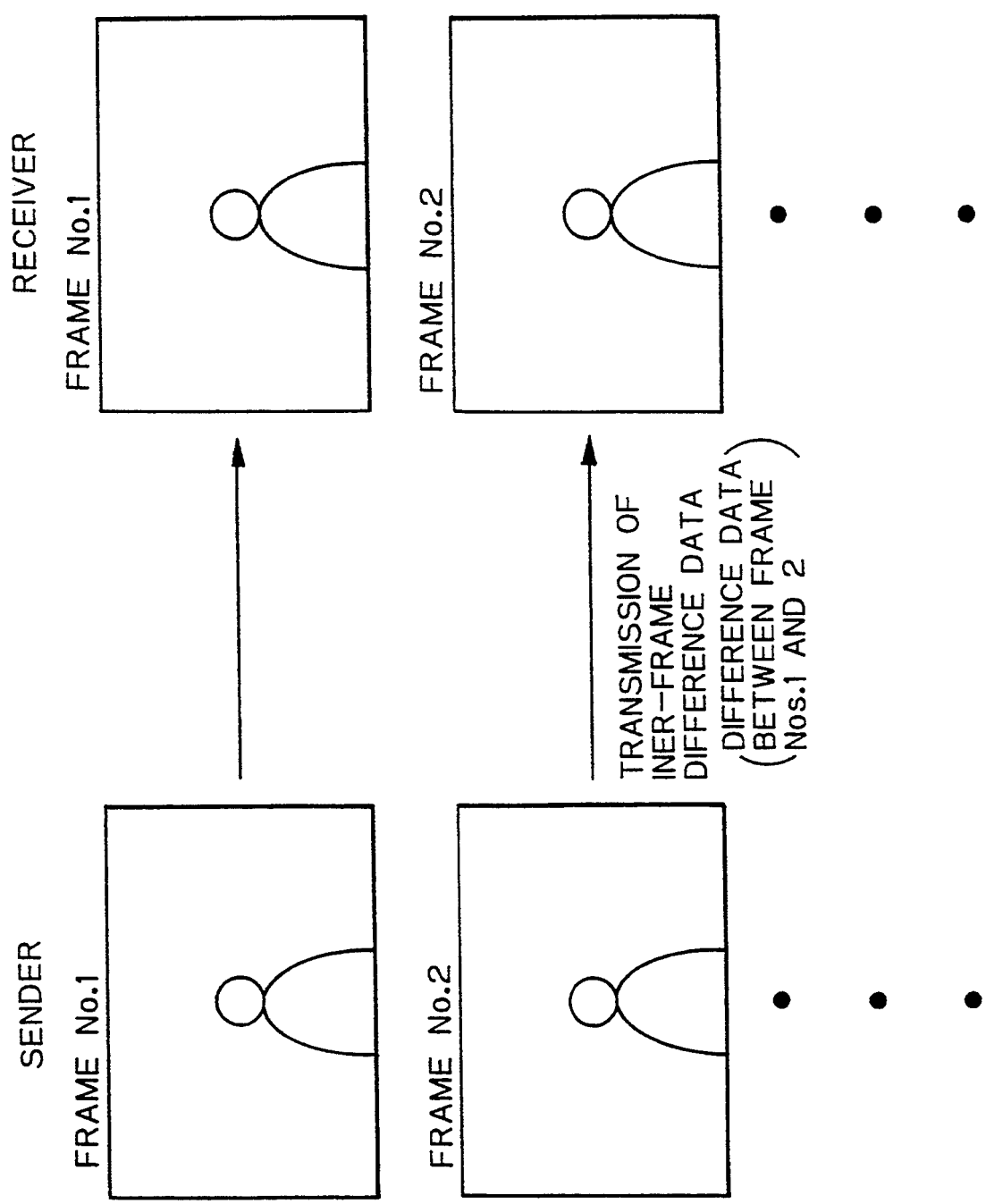
FIG. 1 illustrates a prior art image data compressive transmission system of the inter-frame image data difference transmission type.

In an inter-frame image data difference transmission system shown in FIG. 1, only an inter-frame difference of image data between two successive frames is transmitted when reproducing the images in the frames at the receiver.

Figure 2:
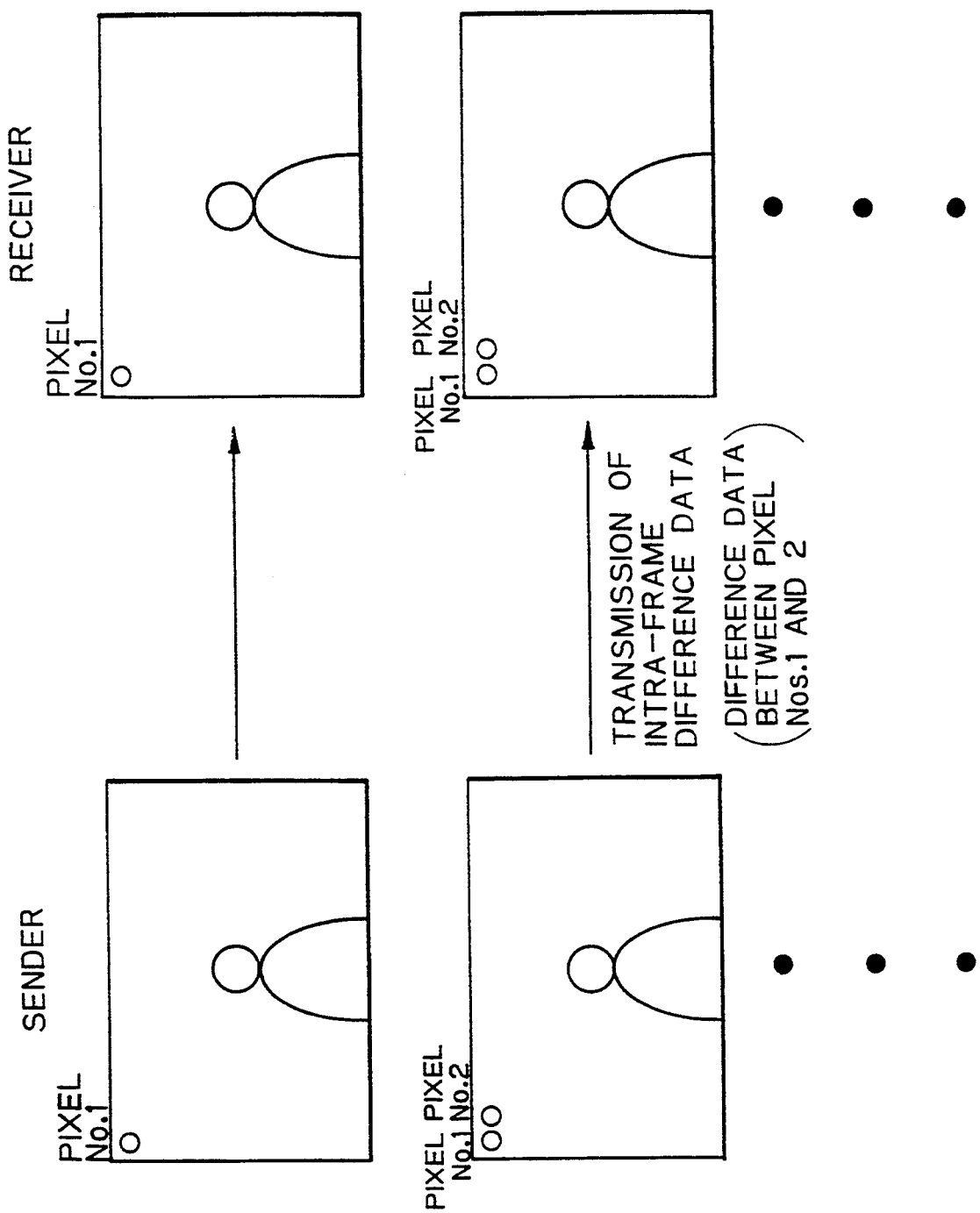
FIG. 2 illustrates a prior art image data compressive transmission system of the intra-frame image data difference transmission type.

In an intra-frame image data difference transmission system shown in FIG. 2, only a difference of pixel data between two successive pixels is transmitted when reproducing the images in the frames at the receiver.

In a system transmitting an image data difference for each block of an image plane shown in FIG. 3, only a difference of data between two successive blocks is transmitted when reproducing the images in the frames at the receiver.

In an inter-frame motion-compensating type coding system for each block of an image plane shown in FIG. 4, only an integrated value of differences between data of pixels of a block and an estimated block and information on a motion vector between blocks are transmitted to reproduce the images in the frames at the receiver. The inter-frame motion compensating type coding technique is described, for example, in Japanese Examined Patent Publication (Kokoku) No. 2-20196.

In a sequence of picking-up images of persons at a television conference as shown in FIG. 5, where the pick-up camera is directed to person-D (STEP-1), if the image of person A is to be picked up, the pick-up camera is directed to person-A in the camera direction presetting manner (STEP-2). If person-A is not present exactly at the registered position but is at a position shifted from the registered position, the image of person-A is not produced in the center of the image plane as shown in STEP-2 of FIG. 5. Therefore, to bring the image of person-A to the center of the image plane, it is necessary to adjust the direction of the pick-up camera by an operation of a remote control device as shown in STEP-3 of FIG. 5.

Figure 6B:
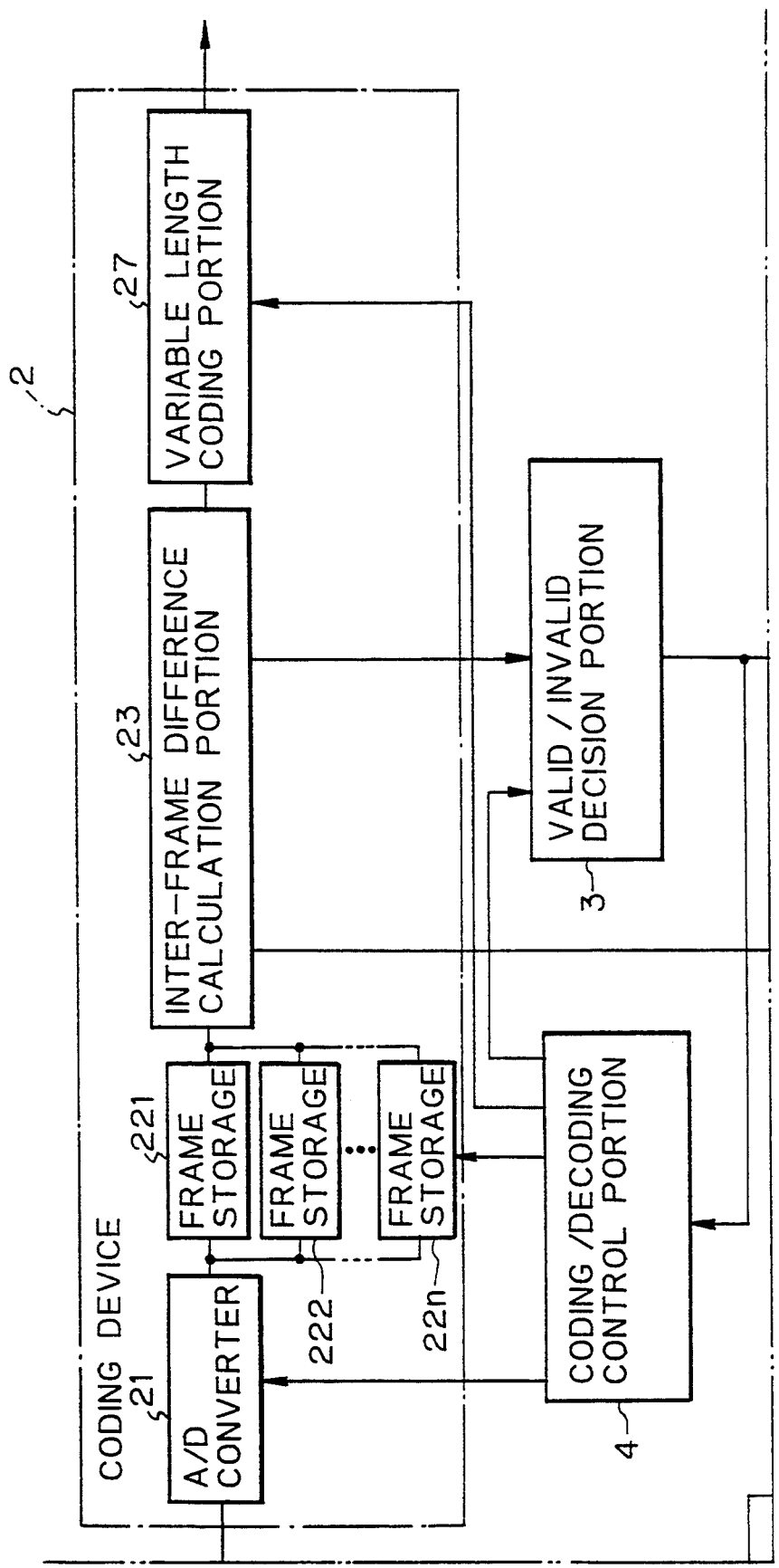

A schematic diagram of an apparatus for carrying out a method of automatically controlling an image pick-up position of an object according to an embodiment of the present invention, of the inter-frame image data difference transmission type, is shown in FIGS. 6A–6C. The apparatus of FIGS. 6A–6C is constituted by a camera 12 having an electromotive lens 11, a camera rotating table 13, a coding device 2 having an analog to digital converter 21, frame storages 221, 222, . . . 22n, an interframe difference calculation portion 23, and a variable length coding portion 27, a valid/invalid decision portion 3, a coding/decoding control portion 4, a position data decoder 5, a motion direction decision device 6 having AND gates 611, 612, 613, and 614, counters 621, 622, 623, and 624, a comparison portion 63, and a table controller 7.

The principle of the operation of the apparatus of FIGS. 6A–6C is based on the fact that the target person cannot remain motionless but must occasionally move, and accordingly, the inter-frame difference of the image of the target person must be increased in accordance with a movement of the target person. Thus, it is possible to direct the camera to a position in the image plane at which the inter-frame difference is increased.

The signal of the image picked up by camera 12 having an electromotive lens 11 is converted by an analog-to-digital converter 21 into digital signals, which are successively stored in frame storages 221, 222, . . . 22n. The differences between the frame storages 221, 222, . . . 22n are calculated at an inter-frame difference calculation portion 23 for each pixel, the result of the calculation is variable length coded in a variable length coding portion 27, and the coded signal is delivered to the transmission line.

The difference data produced by the inter-frame difference calculation portion 23 is supplied to a valid/invalid decision portion 3 in which the supplied data is compared with predetermined data as threshold value data supplied from the coding/decoding control portion 4, which controls the analog-to-digital converter 21, the frame storages 221, 222, . . . 22n, and the variable length coding portion 27. The valid data is delivered from the valid/invalid decision portion 3 when the supplied data is greater than the threshold value data. The valid data from the valid/invalid decision portion 3 and the data of the calculated position in the image plane output by the position data decoder 5, which receives the data of the calculated position in the image plane from the inter-frame difference calculation portion 23, are supplied to the motion direction decision device 6.

Figure 10:
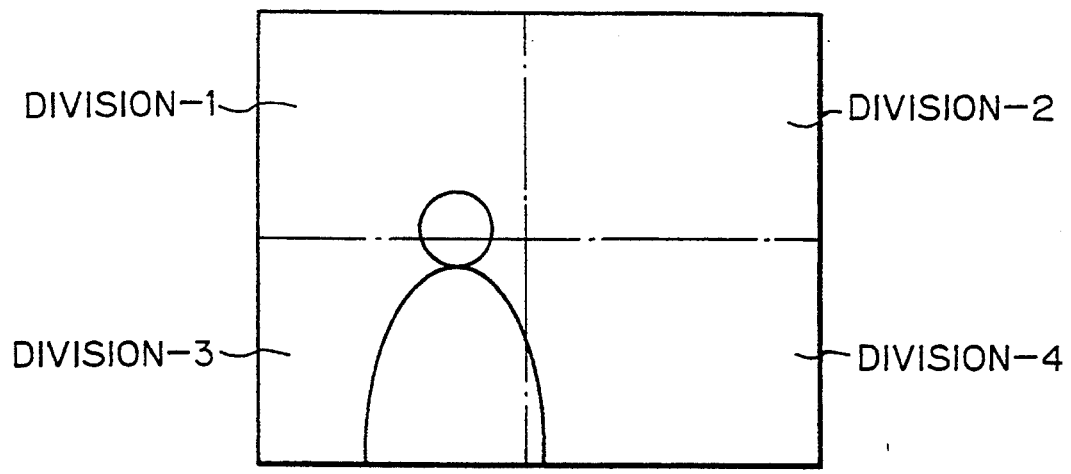
FIG. 10 illustrates an example of the dividing of an image plane.

In the motion direction decision device 6, the counting of the valid data for each of four divisions of the image plane is carried out by counters 621, 622, 623, and 624. The image plane is divided, for example, into four divisions, by lines passing through the center of the image plane as shown in FIG. 10. The outputs of the counters 621, 622, 623, and 624 are supplied to a comparison portion 63. The output of comparison portion 63, which is the result of a comparison indicating the direction of motion corresponding to the highest count among the counters, is supplied to table controller 7.

The output of the table controller 7 is supplied to the camera rotating table 13, which then rotates the camera 12 placed on camera rotating table 13, and thus camera 12 is rotated in the desired direction.

An apparatus according to another embodiment of the present invention is shown in FIGS. 7A–7C. The apparatus of FIGS. 7A–7C is basically similar to the apparatus of FIGS. 6A–6C, but the apparatus of FIGS. 7A–7C is an intra-frame image data difference transmission type. The principle of the operation of the apparatus of FIGS. 7A–7C is based on the fact that the image of the background scene of a conference room is simpler, with regard to a color density and brilliance of an image, than the image of a target person, and therefore, the amount of information on the image of the target person is greater than that of the background scene, and accordingly, the intraframe difference of the image of the target person must be increased. Therefore, it is possible to direct the camera to the position in the image plane at which the intra-frame difference is increased.

The coding device 2 is constituted by an analog-to-digital converter 21, a frame storage 22, an intra-frame difference calculation portion 24, and a variable length coding portion 27.

In the intra-frame difference calculation portion 24, the calculations of the intra-frame differences are carried out for each of the pixels stored in frame storage 22, and the output of the intra-frame difference calculation portion 23 is supplied to the valid/invalid decision portion 3.

Figure 8B:
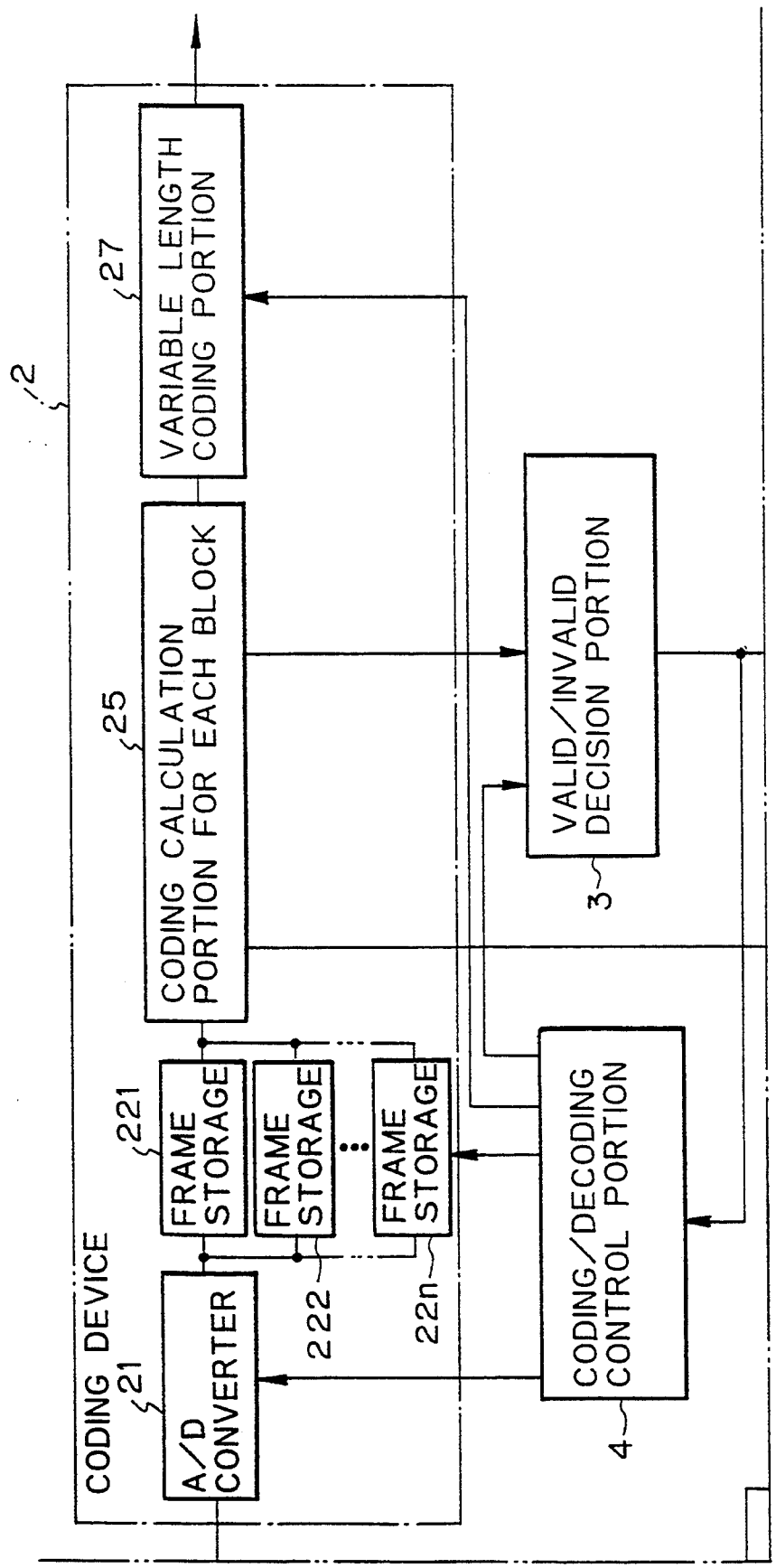

An apparatus according to another embodiment of the present invention is shown in FIGS. 8A–8C. The apparatus of FIGS. 8A–8C is basically similar to the apparatus of FIGS. 6A–6C, but the apparatus of FIGS. 8A–8C is a type which transmits an image data difference for each block of an image plane. The principle of the operation of the apparatus of FIGS. 8A–8C is based on the fact that the inter-block difference is increased as the target person moves. Thus, it is possible to direct the camera to the position in the image plane at which the intra-frame difference is increased.

In the coding calculation portion for each block 25, the differences between data stored in the frame storages 221, 222, . . . 22n, concerning 8×8 pixels, 16×16 pixels, etc., are calculated for each block, and the result of the calculation is compared with a predetermined value, as a threshold value.

An apparatus according to still another embodiment of the present invention is shown in FIGS. 9A–9C. The apparatus of FIGS. 9A–9C is basically similar to the apparatus of FIGS. 6A–6C, but the apparatus of FIGS. 9A–9C is the coding of the inter-frame motion-compensating type for each block of an image plane. The principle of operation of the apparatus of FIGS. 9A–9C is based on the fact that a target person must sometimes move, and accordingly, the number of valid blocks with motion vectors must be increased at the position of the target person in the image plane. Thus, it is possible to direct the camera to position in the image plane at which the number of blocks with motion vectors is increased.

In the motion compensation estimation portion for each block 26, the differences between data stored in frame storages 221, 222, . . . 22n, concerning 8×8 pixels, 16×16 pixels, etc., are calculated for each block, and the result of the calculation is compared with a predetermined value, as a threshold value.

I claim:

1. A method of automatically controlling an image pick-up position of an object comprising the steps of:
   picking up images of an object and producing data of images therefrom;
   compressively coding derived image data and producing valid image data;
   dividing an image plane of each frame into a plurality of divisional areas by lines passing through a center of the image plane;
   counting a number of valid image data in each divisional area;
   producing information on a position to which a calculation of image data is directed;
   deciding a direction determined by a highest count among counting results of said plurality of divisional areas;
   instructing a direction of motion of a camera rotation table based on the direction decision; and
   controlling motion of the camera rotation table in accordance with the direction of motion instruction wherein the control of the camera rotation table includes the step of
   preliminarily designation of a plurality of image pick-up positions where the objects are to exist,
   assigning and recording an identification number for each of the image pick-up positions,
   automatically directing the camera to one of the designated image pick-up positions by selecting of the assigned identification numbers, and
   picking up the image of the object at one of the designated image pick-up positions based on the instruction of the direction of motion of the camera rotation table.

2. A method according to claim 1 further comprising a step of deciding validity of the image data.

3. A method according to claim 2, wherein the decision on the validity of the image data is based on a comparison thereof with a predetermined threshold value.

4. A method according to claim 3, wherein the compressive coding of image data is a compressive coding using inter-frame image difference data.

5. A method according to claim 3, wherein the compressive coding of image data is a compressive coding using intra-frame image difference data.

6. A method according to claim 3, wherein the compressive coding of image data is a compressive coding using image data difference for each block of an image plane.

7. A method according to claim 3, wherein the compressive coding of image data is a compressive coding using an image motion compensatory estimation value for each block of an image plane.

8. An apparatus for automatically controlling an image pick-up position of an object comprising:
   an image pick-up camera for picking up an image of an object;
   camera rotation table for placing a camera thereon and rotating the camera;
   data compressive coding means for compressively coding data of an image picked up by the image pick-up camera;
   image plane divisional means for dividing an image plane of each frame by lines passing through a center of the image plane;
   a counter for counting a number of valid image data in each divisional area;
   position information production means for producing information on a position to which a calculation of image data is directed;
   motion direction decision means for deciding a direction of motion of the camera rotation table based on said number of valid image data in each divisional area; and
   motion control means for controlling a motion of the camera rotation table in accordance with the decided direction wherein the control of the camera rotation table is carried out such that
   a plurality of image pick-up positions, where the objects are to exist, are preliminarily designated,
   an identification number is assigned and recorded for each of the image pick-up positions,
   the camera is directed automatically to one of the designated image pick-up positions by selecting one of the assigned identification numbers; and
   the image of the objects, at one of the designated image pick-up positions, is picked up based on the instruction of the direction of motion of the camera rotation table.

9. An apparatus according to claim 8, further comprising image data validity decision means for deciding the validity of the image difference data.

10. An apparatus according to claim 9, wherein the decision of the image data validity by the data validity decision means is based on a comparison thereof with a predetermined threshold value.

* * * * *